United States Patent [19]

Hahn

[11] Patent Number: 5,247,319
[45] Date of Patent: Sep. 21, 1993

[54] PHOTOGRAPHIC APPARATUS

[76] Inventor: Randall A. Hahn, 6231 Lomo Alto, Dallas, Tex. 75205

[21] Appl. No.: 590,363

[22] Filed: Sep. 28, 1990

[51] Int. Cl.⁵ ............................................. G03B 29/00
[52] U.S. Cl. ...................................... 354/76; 354/290
[58] Field of Search ....................... 354/75, 76, 81, 83, 354/96, 195.1, 195.12, 293, 354, 290

[56] References Cited

U.S. PATENT DOCUMENTS

| | | | |
|---|---|---|---|
| 3,738,241 | 6/1973 | Bahnsen | 354/195.1 |
| 4,431,289 | 2/1984 | Reinhardt | 354/96 |
| 4,757,372 | 7/1988 | Betensky et al. | 354/195.12 X |
| 4,771,305 | 9/1988 | Potoroka | 354/290 |

FOREIGN PATENT DOCUMENTS 359394  8/1906  France .............................. 354/290

Primary Examiner—Michael L. Gellner
Assistant Examiner—Howard B. Blankenship
Attorney, Agent, or Firm—Ross, Howison, Clapp & Korn

[57] ABSTRACT

A trailer-mounted, operator-resident camera having a reflected light viewing system. The camera comprises apparatus for scrubbing and controlling the temperature and humidity of air inside the camera and apparatus for adjusting the distance between the lens assembly and the film plane. Alternative embodiments comprising apparatus for adjusting the position of the film plane inside the camera and for using a pivotable lens assembly and a curved film plane are also disclosed.

19 Claims, 3 Drawing Sheets

5,247,319

PHOTOGRAPHIC APPARATUS

TECHNICAL FIELD

This invention relates to cameras, and more particularly, to a trailer-mounted, operator-resident camera having a reflected light viewing system.

BACKGROUND OF THE INVENTION

It is well known among photographers that large-format cameras and negatives are desirable for use in producing enlarged photographic prints having a high degree of resolution, especially where the subject matter to be photographed is expansive such as, for example, landscapes or large crowds. Notwithstanding the previous efforts of others, an ultra-large format camera is needed that is easily transportable, but adapted for taking photographs with film having frame dimensions ranging up to several feet in each direction.

SUMMARY OF THE INVENTION

According to the present invention, a large-format photographic apparatus is provided that is adapted to accommodate large film sizes and is also adapted to accommodate the operator inside the camera. According to a preferred embodiment of the invention, the camera is skid-mounted on a trailer to make it easily transportable.

The camera portion of the subject photographic apparatus preferably comprises a doorway for admitting the operator and film into the camera, a second wall and doorway within the camera that functions as a light trap while the operator is entering or leaving the camera, means for controlling the temperature and humidity of air inside the camera, means for filtering the air inside the camera, and means for adjusting the distance between the lens and the film plane.

According to another embodiment of the invention, a photographic apparatus is provided that comprises a trailer adapted to be towed by a motor vehicle, a large-format, operator-resident camera adapted to be mounted on the trailer, and means for leveling and stabilizing the trailer during use of the camera.

According to another embodiment of the invention, an operator-resident camera comprises a curved film plane and a pivotable lens assembly adapted to pivot relative to the curved film plane during exposure of the film.

According to another embodiment of the invention, a large-format, operator-resident camera is provided that comprises a reflected light viewing system.

According to another embodiment of the invention, an operator-resident camera is provided that comprises means permitting the operator to view the subject matter to be photographed from inside the camera while the film is in place.

BRIEF DESCRIPTION OF DRAWINGS

The apparatus of the invention is further described and explained in relation to the following figures of the drawings in which.

Like reference numerals are used to indicate like parts in all figures of the drawing.

DETAILED DESCRIPTION OF THE INVENTION

Figure 1:
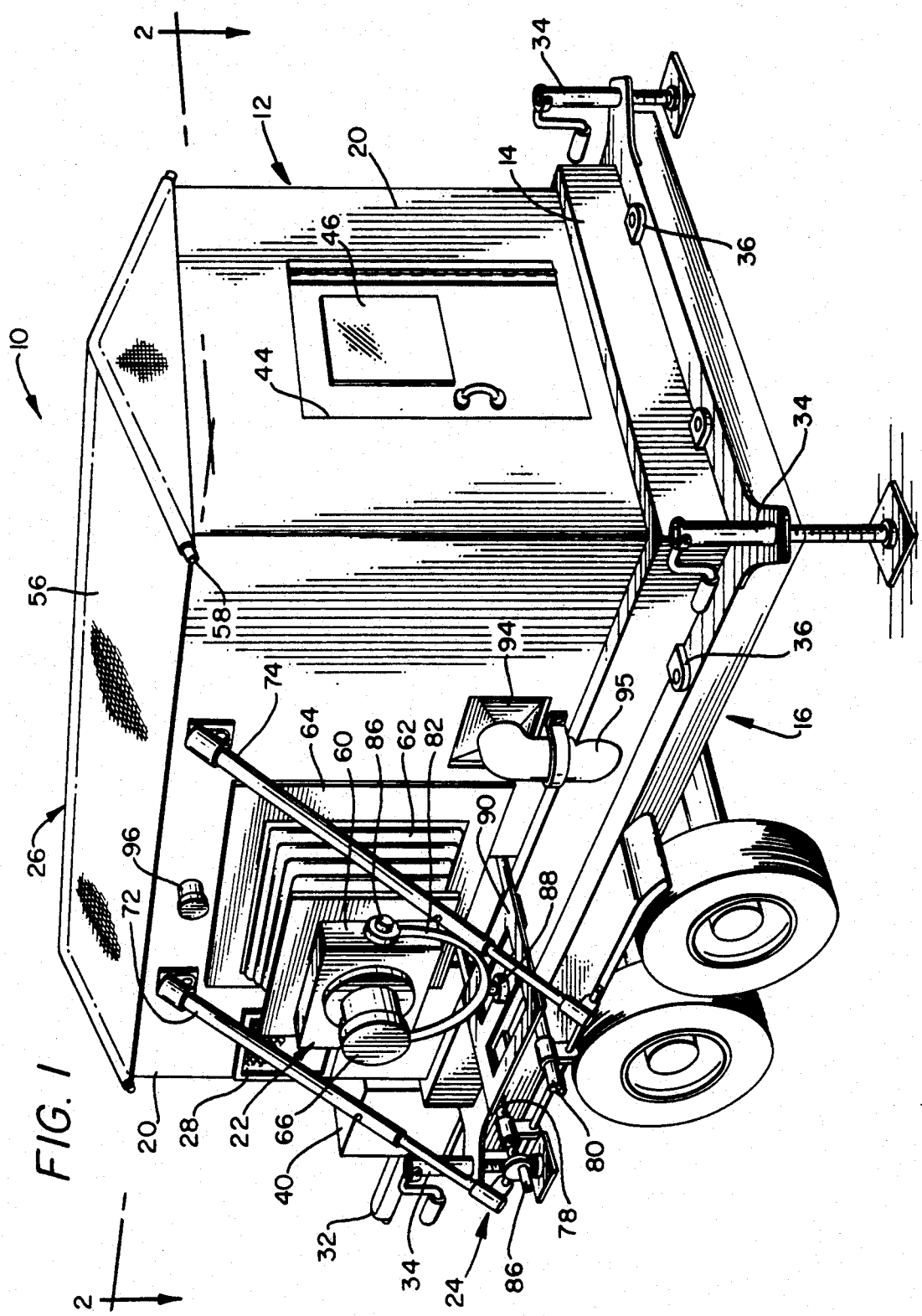
FIG. 1 is a perspective view of the photographic apparatus of the invention.
Figure 2:
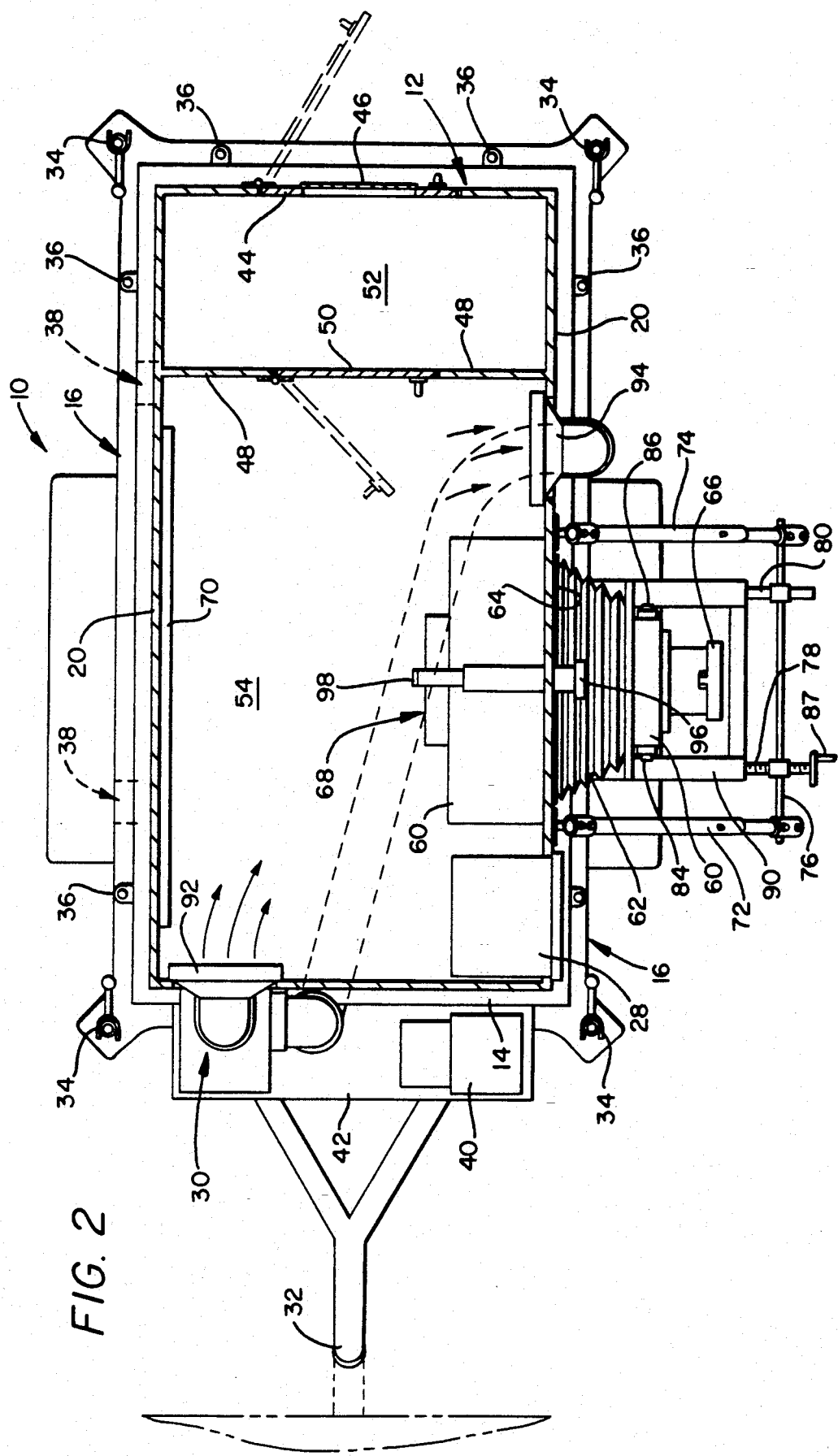
FIG. 2 is a plan view of the photographic apparatus of FIG. 1.

Referring to FIGS. 1 and 2, photographic apparatus 10 preferably comprises camera 12 mounted on skid 14, which is in turn mounted on trailer 16. Camera 12 preferably further comprises a body 20 primarily consisting of front, back and end side walls, top and bottom walls, and, according to a particularly preferred embodiment, canopy 26. Lens assembly 22 is preferably installed in the front wall of body 20 and is further supported by outwardly extending lens support assembly 24. Temperature control means 28 and scrubbing system 30 are preferably provided for use in controlling atmospheric conditions within camera 12.

Trailer 16 is preferably equipped with hitch 32 and is adapted to be towed behind a motor vehicle. Trailer 16 is preferably provided with a tandem axle to improve the stability of camera 12 while being towed and during set-up for use. As shown in FIGS. 1 and 2, means such as manually operated jacks 34 are desirably provided at the corners of trailer 16 for use in leveling and stabilizing photographic apparatus 10 at the use site. Alternatively, trailer 16 can be jacked up with conventional hydraulic jacks and placed on blocks at the use site; or, if desired, manually operated jacks 34 can be replaced with motor driven jacks.

Although not shown in the simplified drawings of FIGS. 1 and 2, it is also understood that safety features such as tail lights, brake lights, etc. normally required for trailers towed behind motor vehicles are also desirably provided as part of trailer 16.

According to a preferred embodiment of the invention, camera body 12 is preferably mounted in fixed relation to skid 14, which is removably secured to trailer 16 by means such as bolts 36. Slots 38 are preferably provided on the back side of skid 14 to facilitate removal of skid 14 and camera 12 from trailer 16 by a forklift. Under some circumstances, it may be preferable to remove camera 12 and skid 14 from trailer 16 prior to use. In other instances, particularly in remote locations, it will be preferable to stabilize trailer 16 through use of means such as jacks 34 so that pictures can be taken with camera 12 while skid 14 is still secured to trailer 16. Air scrubbing system 30 and generator 40 are preferably mounted on plate 42 secured to skid 14 to facilitate removal of all auxiliary equipment from trailer 16 together with camera 12.

Camera body 20 of camera 12 preferably comprises top, bottom, end and side walls made of wood or metal, or a combination thereof, preferably laminated with another material adapted to provide thermal insulation. Walls having a honeycomb construction made with a material such as aluminum are particularly preferred. Doorway 44 is provided at one end of camera 12 to facilitate ingress and egress of the operator. If desired, panel 46 of red glass can be inserted in door 44 to illuminate the interior of camera 12 with minimal effect on any film disposed therein. Additionally, interior wall 48 comprising interior doorway 50 is also provided to serve as a light trap during ingress and egress from camera 12.

Interior compartment 52 disposed between doorway 44 and doorway 50 is desirably large enough to accommodate the body of the operator. When entering the camera, doorway 50 is normally closed as doorway 44 is opened. Once the operator is inside interior compartment 52, doorway 44 is closed and doorway 50 is opened to permit the operator to enter interior compartment 54 of camera 12.

According to one preferred embodiment of the invention, the exterior dimensions of camera body 20 are about 8 feet long by about 4 feet high by about 4 feet deep. According to another preferred embodiment of the invention, the exterior dimensions of camera body 20 are about 12 feet long by about 9 feet high by about 5 feet deep.

Canopy 26 preferably comprises a web of ultraviolet resistant, water repellent material 56 stretched over a framework of aluminum poles 58 secured to the top of camera body 12.

Lens assembly 22 preferably further comprises lens housing 60, bellows 62, support plate 64 and lens cap 66. Inside camera 12, as shown in FIG. 2, light is directed through aperture 68 against film plane 70.

Lens support assembly 24 preferably comprises pivotably mounted, telescoping support arms 72, 74 having their outwardly disposed ends connected by transverse rod 76 to horizontal support arms 78, 80. Yoke 82 is attached to lens housing 60 by pins 84, 86 and to frame 90 by pin 88. Frame 90 is adapted to travel forward and backward on horizontal support arms 78, 80. The range of travel is preferably controlled by means such as hand crank 86, or alternatively, by an electrically operated motor drive.

Although as shown in FIGS. 1 and 2, photographic apparatus 10 is adapted to be stabilized and positioned by the operator while standing outside camera 12, or by an outside assistant, while the operator is inside camera 12, it will be appreciated that through the use of other adjustment means such as electrically powered drive motors and remote controls, it is possible for the operator to control the attitude of camera 12 relative to a support surface and to control the position of lens assembly 22 relative to film plane 70 by controls disposed inside camera 12.

Temperature control means 28 is preferably adapted to supply refrigerated or heated air to the interior of camera 12, and to control the humidity of air disposed within camera 12 as appropriate. Scrubbing system 30 preferably comprises inlet 92 and outlet 94 for use in circulating the air inside camera 12 through a scrubbing means adapted to remove lint, dust and other particulate matter suspended in the air inside camera 12 so as to reduce unwanted diffraction or optical interference inside camera 12. Scrubbing unit 30 is preferably powered by generator 40, and return line 95 is preferably routed beneath camera 12 inside skid 14 to the intake side of a pumping unit which is a part of scrubber system 30. If desired, an alternative power source such as batteries or external power supplies can be substituted for generator 40.

The operation of camera 12 is further described and explained in relation to FIG. 2. Assuming that a photograph is to be taken without removing skid 14 from trailer 16, trailer 16 is first positioned, stabilized and leveled as desired, with lens assembly 62 facing the subject matter desired to be photographed. Opening doorways 44 and 50, the operator inserts a canister containing a rolled sheet of film through the doorways into interior compartment 54 of camera 12.

Generator 40 is activated to generate electrical energy, after which temperature control means 28 and air scrubbing system 30 are also activated. Temperature control means 28 is desirably a conventional, commercially available heating/air conditioner unit with manual or thermostat controls. Air scrubbing system 30 desirably comprises filters having a finer mesh size than filters normally utilized in conventional refrigerated air systems, and will also desirably comprise means for controlling the humidity within a range desired by the operator.

The operator crawls into compartment 52, closing doorway 44 behind him, then crawls into interior compartment 54, closing doorway 50. Once inside interior compartment 54 with both doorways closed, the operator secures a reflective image viewing surface over film plane 70. The image viewing surface can be a sheet or other white or light-colored fabric. The use of a reflective viewing surface is needed during composition of the image to be photographed due to the normally black and nonreflective color of film plane 70.

Once the reflective viewing surface is in place, the operator desirably instructs an outside assistant to remove lens cap 66 from lens assembly 60, thereby permitting light to enter interior compartment 54 of camera 12 through aperture 68. The operator desirably positions himself to one side or the other of aperture 68 so that light entering camera 12 through aperture 68 will not be obstructed as it shines on the reflective material covering film plane 70. As the operator views the image reflected off film plane 70, he can orally instruct an assistant outside camera 12 as to any adjustment that should be made with regard to positioning, leveling, or focus. In the embodiment shown in FIG. 2, adjustments to focus are made by operating hand crank 86 to vary the distance between the camera lens and film plane 70. As hand crank 86 is turned, frame 90 traverses forward or backward as desired, moving lens support 60 with it through yoke 82. Bellows 62 expands or contracts in the same manner as with conventional cameras.

Once the desired image is composed and focused on film plane 70, the operator instructs an assistant outside camera 12 to replace lens cap 66. The operator then removes the reflective viewing surface from film plane 70, removes the unexposed film from its canister, and attaches the film to film plane 70.

Although it will be apparent to those of ordinary skill in the art upon reading this disclosure that many different methods and devices can be utilized for attaching unexposed film to film plane 70, satisfactory results are achieved by using a film plane 70 comprising a soft wood or composition board covered with a black fabric so that conventional push pins can be manually inserted into film plane 70 around its edges in such manner that the heads of the push pins hold the edges of the unexposed film against film plane 70 without penetrating the film itself. Other means such as tape, spring clips, and the like, can also be used effectively if desired.

Once the unexposed film is secured to film plane 70, the operator manually covers aperture 68 and instructs an assistant outside camera 12 to again remove lens cap 66. The operator can manually obstruct aperture 68 by holding any opaque, preferably nonreflective, object over aperture 68. Objects useful for this purpose might include a black colored board, a heavy black fabric, or the like. Once lens cap 66 has been removed, the operator exposes the film on film plane 70 by removing the obstruction from aperture 68, thereby permitting light to reach film plane 70. The time required to properly expose the film will depend upon factors well known to photographers, such as, for example, available light, film type, film speed, and the like. Once the desired exposure time is obtained, the operator again covers aperture 68 and instructs an outside assistant to replace lens cap 66.

Once lens cap 66 is in place, it is no longer necessary for the operator to cover aperture 68. The operator can then remove the exposed film from film plane 70 and return it to a light-protected canister for storage until such time as it can be further processed. If no other exposures are to be made, the operator can then exit camera 12 through doorways 50, 44, respectively, taking the canister containing the exposed film with him.

Alternatively, if desired, mechanically or electronically actuated shutters can be utilized to control the passage of light through aperture 68 if desired. Also, a remote viewing system comprising an outwardly facing lens 96 and an inwardly facing viewing means 98 as shown in FIGS. 1 and 2 can be provided if desired to permit the operator to view the image being photographed directly from inside interior compartment 54 of camera 12 while the film is in place to assist the operator in better determining the optimum time for taking the exposure. Such a device may be particularly desirable where the amount of available light is changing rapidly or where moving elements are present within the image field.

Although the viewing device shown in FIGS. 1 and 2 is quite simple, it will be appreciated that other, more sophisticated commercially available viewing devices such as video monitors and the like can also be used within the scope of the invention, although the interiorly-facing portion of such devices should be adapted to permit viewing without permitting unwanted light to enter interior compartment 54 of camera 12 when film is in place.

Figure 3:
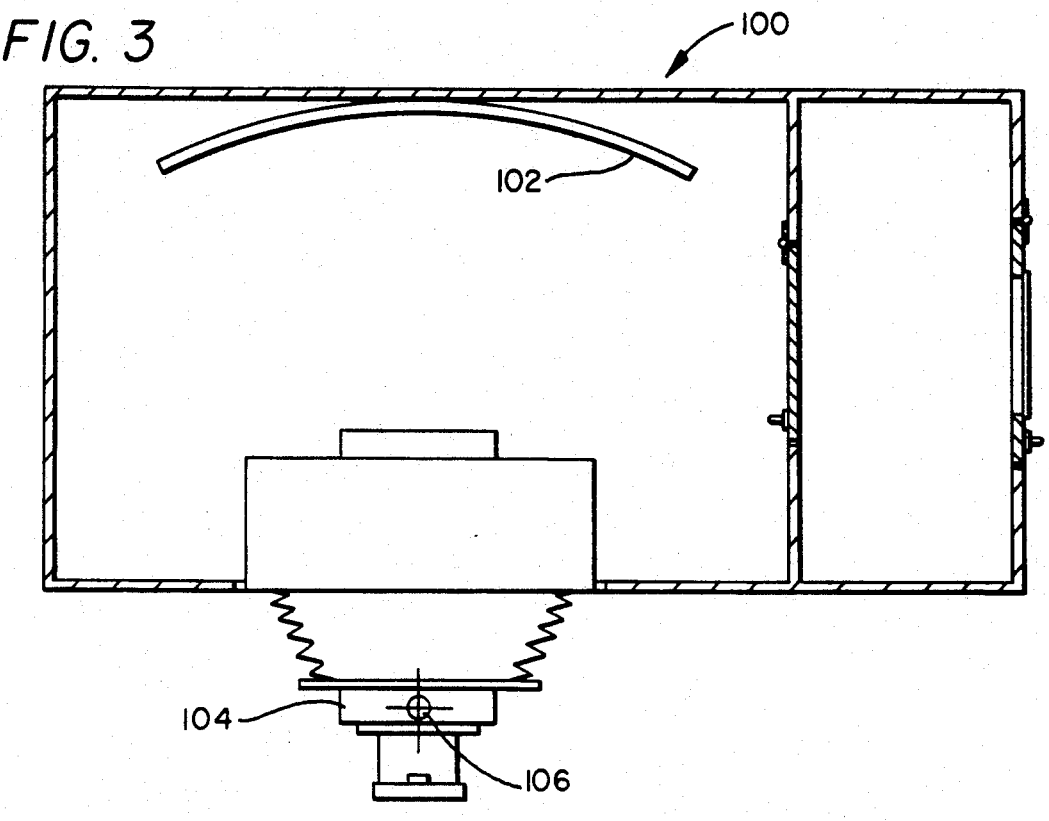
FIG. 3 is a simplified plan view of an alternate embodiment of the camera of the invention depicting a curved film plane and a pivotable lens assembly.

Referring to FIG. 3, an alternate embodiment of the invention is disclosed wherein film plane is curved rather than flat. FIG. 3 is a simplified diagrammatic view of camera 100 wherein film plane 102 is curved in the longitudinal direction. Lens support assembly 104 is desirably pivotally mounted in such manner that it is adapted to rotate horizontally about axis 106. With a camera of this type, by carefully controlling the rotation of lens assembly 104 about axis 106, it is possible to "paint" an exposure onto film plane 102 as lens assembly 104 is panned over the image to be photographed.

Figure 4:
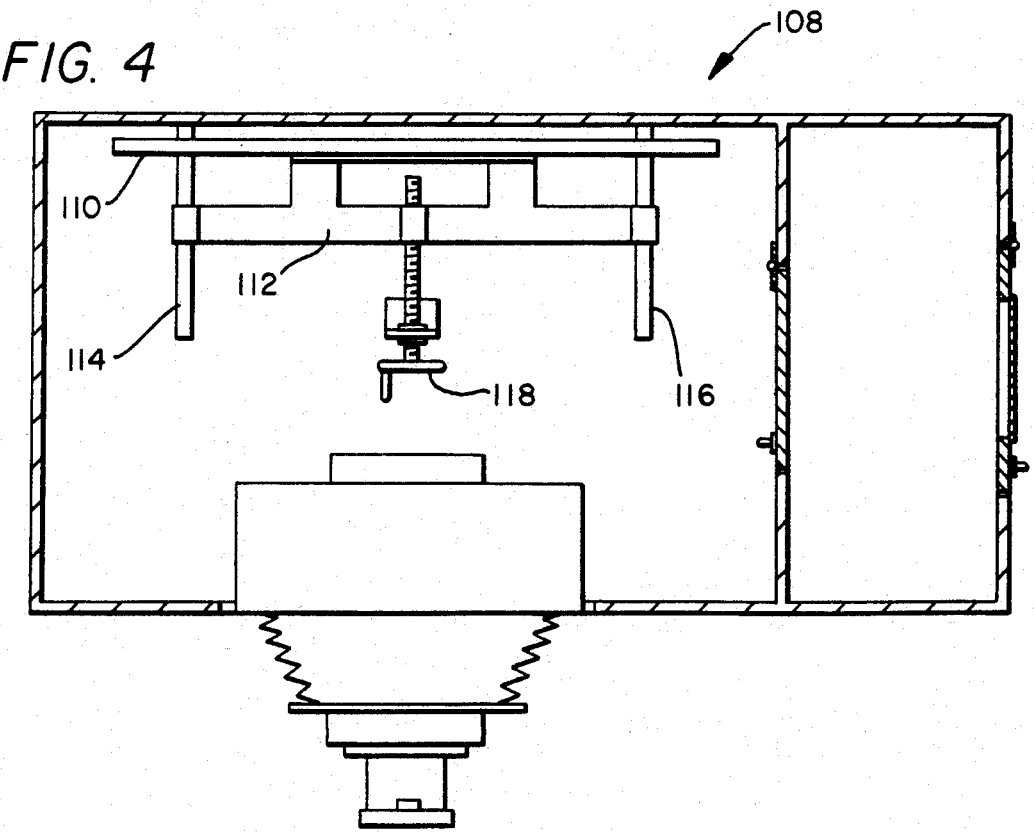
FIG. 4 is a simplified plan view of the camera of the invention comprising means for varying the placement of the film plane within the camera.

According to another embodiment of the invention, as shown in FIG. 4, means for providing for controlling the position of the film plane within the camera. Referring to FIG. 4, camera 108 comprises film plane 110 attached to frame 112 slidably disposed on horizontal support members 114, 116. Means of comprising threaded hand crank 118 are provided for use in adjusting the position of film plane 110 within camera 108 in either a forward or backward direction. Although a mechanical adjustment means is shown in FIG. 4, it will be understood and appreciated by those of skill in the art that more elaborate mechanically or electrically driven means can also be utilized for positioning film plane 110 within camera 108 within the scope of the invention.

Other alterations and modifications of the invention disclosed herein will likewise become apparent to those of ordinary skill in the art upon reading the present disclosure, and it is intended that the scope of the invention be limited only by the broadest interpretation of the appended claims to which the inventor is legally entitled.

I claim:

1. A photographic apparatus for photographing a subject comprising an operator-resident camera, a trailer for transporting the camera, and means for attaching the operator-resident camera to the trailer; said operator-resident camera further comprising a reflective light viewing system, means for permitting the entire body of the operator to ingress into said camera and egress from said camera, film support means adapted to maintain film within said camera, lens support means adapted to direct light into said camera to said film support means, and means for obstructing the passage of light into said camera through said lens support means.

2. The photographic apparatus of claim 1 wherein said trailer further comprises means for stabilizing said trailer on an underlying support surface.

3. The photographic apparatus of claim 1 wherein said trailer further comprises means for leveling said trailer on an underlying support surface.

4. The photographic apparatus of claim 1 wherein said camera further comprises means for controlling the air temperature inside said camera.

5. The photographic apparatus of claim 1 wherein said camera further comprises means for controlling the air humidity inside said camera.

6. The photographic apparatus of claim 1 wherein said camera further comprises air recirculating and scrubbing means.

7. The photographic apparatus of claim 1 wherein said camera further comprises an interior wall defining first and second interior compartments within said camera, both of said interior compartments being adapted to accommodate the entire body of the operator.

8. The photographic apparatus of claim 7 wherein said first internal compartment of said camera comprises a doorway communicating with the outside of said camera, said doorway being sufficiently large to permit ingress and egress of the operator.

9. The photographic apparatus of claim 8 wherein said interior wall comprises a second doorway, said second doorway being sufficiently large to permit ingress and egress of the operator.

10. The photographic apparatus of claim 1, further comprising means enabling the operator to directly view an image of the subject to be photographed from inside the camera.

11. A camera for use in photographing a subject, said camera comprising a body adapted to accommodate the entire body of an operator inside the body and comprising a reflected light viewing system adapted to permit the operator to view an image of the subject to be photographed from inside the camera.

12. The camera of claim 11, being skid-mounted on a towable trailer.

13. The camera of claim 11, further comprising means for controlling the air temperature within said camera.

14. The camera of claim 11, further comprising means for controlling the air humidity within said camera.

15. The camera of claim 11, further comprising means for scrubbing air within said camera.

16. The camera of claim 11, further comprising a lens, a film plane, and means for adjusting the distance between the lens and the film plane.

17. The camera of claim 16 wherein the position of the film plane is adjustable within said camera.

18. The camera of claim 11 comprising a curved film plane and a pivotable lens assembly adapted to pivot relative to the curved film plane during exposure of the film.

19. The camera of claim 11, said camera comprising a film plane, means for securing film to said film plane, and means permitting the operator to view the subject to be photographed from inside the camera while said film is secured to said film plane.

* * * * *